United States Patent [19]

Hamamoto et al.

[11] Patent Number: 5,661,526
[45] Date of Patent: Aug. 26, 1997

[54] BROADCAST SIGNAL RECEIVER AND TAPE RECORDER AND, METHOD OF DETECTING ADDITIONAL INFORMATION CHANNEL

[75] Inventors: Kenji Hamamoto, Tokyo; Kazuhiro Nagura, Kanagawa; Takamichi Yoshida; Tomoyuki Hanai, both of Tokyo, all of Japan

[73] Assignee: Sony Corporation, Tokyo, Japan

[21] Appl. No.: 293,916

[22] Filed: Aug. 22, 1994

[30] Foreign Application Priority Data

Aug. 25, 1993 [JP] Japan .................. 5-210613
Sep. 3, 1993 [JP] Japan .................. 5-219831
Sep. 16, 1993 [JP] Japan .................. 5-230230

[51] Int. Cl.⁶ .......... H04N 7/087; H04N 11/00; H04N 7/10; H04N 5/76
[52] U.S. Cl. .......... 348/465; 348/6; 348/460; 348/468; 348/473; 348/731; 348/906; 386/13; 386/85
[58] Field of Search .......... 348/460, 461, 348/465, 468, 478, 473, 906, 6, 9, 732, 734, 731; 358/320, 337, 335; 360/69, 79; 386/1, 13, 46, 85, 14–20, 86–91; H04N 7/00, 11/00, 7/10, 7/08, 7/084, 7/087, 5/76

[56] References Cited

U.S. PATENT DOCUMENTS

| | | | |
|---|---|---|---|
| 4,635,121 | 1/1987 | Hoffman et al. | 348/731 |
| 5,210,611 | 5/1993 | Yee et al. | 348/906 |
| 5,315,452 | 5/1994 | Hong | 360/73.07 |
| 5,329,376 | 7/1994 | Kim et al. | 358/335 |
| 5,418,621 | 5/1995 | Park | 358/335 |
| 5,418,782 | 5/1995 | Wasilewski | 348/906 |
| 5,432,558 | 7/1995 | Kim | 348/906 |
| 5,450,135 | 9/1995 | Schick | 348/732 |
| 5,479,266 | 12/1995 | Young et al. | 358/335 |

FOREIGN PATENT DOCUMENTS

| | | | |
|---|---|---|---|
| 2-166978 | 6/1990 | Japan | 348/906 |
| 2 256 549 | 12/1992 | United Kingdom | H04N 5/782 |

Primary Examiner—Glenton B. Burgess
Assistant Examiner—John W. Miller
Attorney, Agent, or Firm—William S. Frommer; Alvin Sinderbrand

[57] ABSTRACT

The video cassette recorder selects channels in succession, determines the presence or absence of additional information included in the broadcast signal for the selected channel, and stores the selected channel regarded as a reception channel for the additional information when detecting the presence of the additional information in the broadcast signal. Further, the recorder extracts station identification information included in the broadcast signal for the selected channel, provides a VCR Plus guide channel corresponding to the station identified by the station identification information, and stores in its memory the relationship between the selected channel and the VCR Plus guide channel. Moreover, the recorder compares a remaining recording time available with the program continuation time extracted from the broadcast signal, and controls a recording speed mode appropriately based on the comparison.

27 Claims, 10 Drawing Sheets

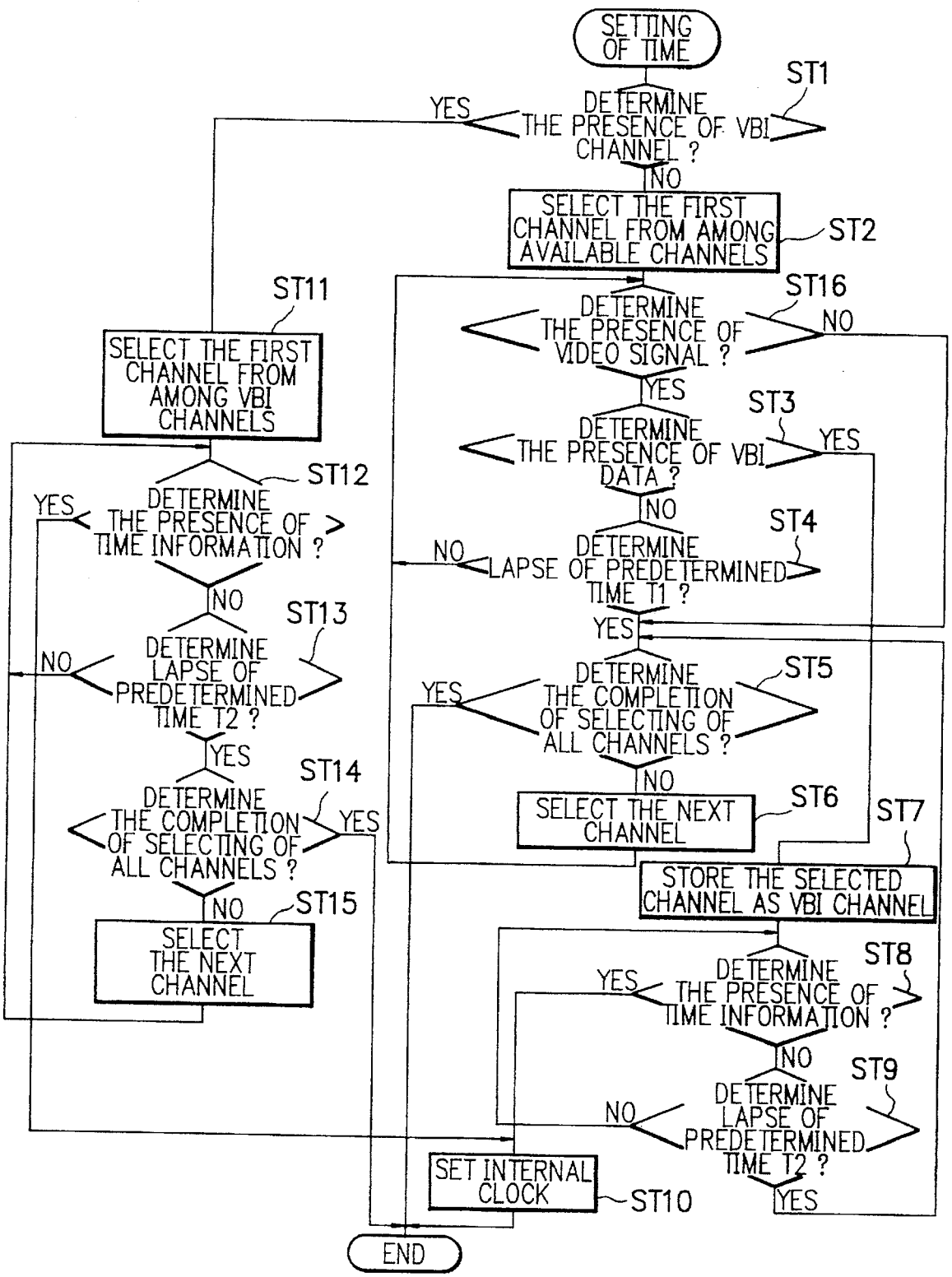
F I G. 5

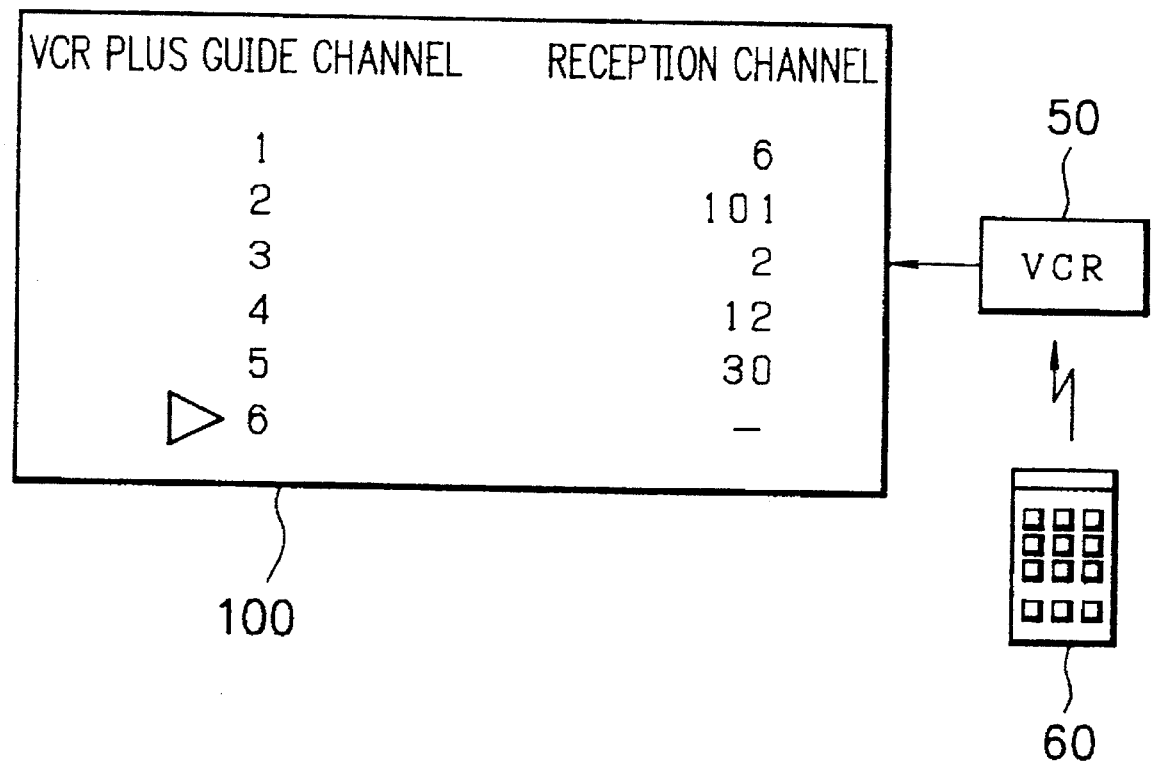
F I G. 8

BROADCAST SIGNAL RECEIVER AND TAPE RECORDER AND, METHOD OF DETECTING ADDITIONAL INFORMATION CHANNEL

BACKGROUND OF THE INVENTION

1. Field of the Invention

The present invention relates in general to a broadcast signal receiver and a tape recorder, and in particular, to a VCR (video cassette recorder) and a TV (television set) that use additional information included in a broadcast signal, to a method of detecting such additional information channels, and to a tape recorder for recording onto a magnetic tape the broadcast signal (the video, audio, and other signals) for a specific program.

2. Description of the Related Art

Before using a timer operation, the user had to set the internal clock for the VCR manually, confirming the time with the display on a TV monitor or on a commander (a remote control transmitter). Thus, the timer operation (for example, timer recording) is not convenient for a person who finds it difficult to set the internal clock. Even if the internal clock has been set initially, it may require adjustment in the event the power supply cord is pulled out of the socket, a long time has passed, or there has been a change between daylight saving and ordinary time. It is often troublesome for a user to set the internal clock again manually.

In order to save the user from such difficulties, it is disclosed herein that such an internal clock may be set according to information included in a video signal, in other words, time data extracted from VBI data which are multiplexed with the vertical interval time code of the video signal.

Some VCRs can be programmed for a later recording using a VCR Plus code. The VCR decodes the VCR Plus code it receives in order to obtain start and stop times for recording, and the VCR Plus guide channel. The VCR then stores the reception channel (the TV channel) corresponding to the VCR Plus guide channel into a pre-set memory. The VCR memory stores in advance relationship between the VCR Plus guide channel and the reception channel in order to convert the guide channel into the reception channel. Accordingly, as shown in FIG. 8, it is often troublesome for the user to operate a remote control commander 60 (transmitter) or a VCR 50 in order to input the reception channel corresponding to the VCR Plus guide channel.

In general, when recording a program with the VCR using a broadcast signal, the user has to confirm before starting the recording that the amount of tape remaining in the cassette tape to be used for the recording is sufficient for the program to be recorded. However, problems may occur in the recording of the whole program because the user did not confirm the amount of cassette tape remaining or because the recording was performed in the SP mode (standard speed mode) instead of the EP mode (⅓ speed mode).

References which relate to the present invention are U.S. Pat. Nos. 4,329,684, 4,390,901, 4,499,179, and 4,635,121.

OBJECT AND SUMMARY OF THE INVENTION

It is accordingly an object of the present invention to provide an improved broadcast signal receiver and a method for detecting a channel representing a broadcast signal which signal includes additional information, (such channel referred to below as the "additional information channel"), in order to extract, for example, time data for setting the internal clock.

It is accordingly another object of the present invention to provide an improved broadcast signal receiver which automatically stores in the memory the relationship between the VCR Plus guide channel and the reception channel automatically.

It is accordingly a further object of the present invention, to provide an improved tape recorder which is able to adjust recording speed in order to automatically and appropriately match such speed to the length of the program that is to be recorded to the amount of recording tape remaining.

A broadcast signal receiver, according to the first invention, comprises a channel selection means for selecting channels in succession, an information detection means for determining the presence or absence of additional information included in the broadcast signal for each of the selected channels, and a memory for storing the selected channel as a reception channel containing the additional information when the information detecting means detects the presence of the additional information.

A method of detecting reception channels containing additional information through a broadcast signal receiver, according to the second invention, comprises the steps of selecting channels in succession, determining the presence or absence of additional information included in the broadcast signal for each of the selected channels, and storing in the memory the selected channel regarded as a reception channel containing the additional information when detecting the additional information in the broadcast signal for the selected channel.

A broadcast signal receiver, according to the third invention comprises a first channel selection means for selecting channels in succession at the time of auto pre-set, a first information detection means for determining, during the first period of time, the presence or absence of additional information included in the broadcast signal for each of the selected channels by the first channel selection means, a second channel selection means for selecting channels in succession independently of the first channel selection means, a second information detection means for determining, during the second period of time which is longer than the first period of time, the presence or absence of additional information included in the broadcast signal for each of the selected channels by the second channel selection means, and a memory for storing the selected channel as a reception channel for the additional information when the first or second information detecting means determines the presence of the additional information in the broadcast signal for the selected channel.

A method of detecting a reception channel, according to the fourth invention, containing additional information through a broadcast signal receiver, comprises the steps of selecting channels in succession at the time of auto pre-set, determining, during the first period of time, the presence or absence of additional information included in the broadcast signal for the first channel selected at the time of the auto pre-set, storing the first selected channel as a reception channel for the additional information in a memory when detecting, during the first period of time, the presence of the additional information in the broadcast signal for the first selected channel, selecting channels in succession independently of the auto pre-set, determining, during a second period of time which is longer than the first period of time, the presence or absence of a additional information included in the broadcast signal for the second channel selected independently of the auto pre-set, and storing in a memory the second selected channel regarded as a reception channel for the additional information when detecting, during the second period of time, the presence of the additional information in the broadcast signal for the second selected channel.

A broadcast signal receiver, according to the fifth invention, has an external tuner and video processor which comprises a channel selection means for selecting channels in succession, an information detection means for determining the presence or absence of additional information included in the broadcast signal for each of the selected channels, and a memory for storing the selected channel as a reception channel containing the additional information when the information detecting means determines the presence or absence of the additional information in the broadcast signal for the selected channel.

A method of detecting a reception channel, according to the sixth invention, containing additional information through a broadcast signal receiver having an external tuner and a video processor, comprises the steps of the video processor directing an external tuner to select channels in succession, the video processor determining the presence or absence of additional information included in the broadcast signal for the selected channel, and storing in the memory the selected channel as a reception channel containing the additional information when detecting the additional information in the broadcast signal for the selected channel.

A broadcast signal receiver, according to the seventh invention, comprises a channel selection means for selecting channels in succession, an information extracting means for extracting station identification information included in the broadcast signal for each of the selected channels, a guide channel providing means for providing a VCR Plus guide channel corresponding to the station identified by the station identification information, and a memory for storing relationship between the selected channel and the VCR Plus guide channel.

A broadcast signal receiver, according to the eighth invention, has an external tuner and a video processor which comprises a channel selection means for directing the external tuner to select channels in succession, an information extracting means for extracting station identification information included in the broadcast signal for each of the selected channels, a guide channel providing means for providing a VCR Plus guide channel corresponding to the station identified by the station identification information, and a memory for storing relationship between the selected channel and the guide channel.

A tape recorder, according to the ninth invention, comprises a time measuring means for measuring the remaining recording time available corresponding to the amount of remaining tape of a cassette, which is to be used for recording, at the time of starting the recording, a program time extracting means for extracting a program continuation time from a broadcast signal which carries program time information, a time comparing means for comparing the remaining recording time available with the program continuation time, and a mode control means for controlling a recording speed mode appropriately according to the comparison of the time comparing means.

In accordance with one aspect of the first and second invention, a broadcast signal receiver selects channels in succession, and stores in its memory certain selected channels as additional information channels when detecting the broadcast signal that includes such additional information. Thus, the receiver can select the additional information channel from among the other channels.

In accordance with another aspect of the third and fourth invention, a broadcast signal receiver selects channels in succession at the time of an auto pre-set, and stores in its memory certain selected channel as additional information channels when detecting a broadcast signal that includes such additional information. Thus, the receiver can select the additional information channel from among the other channels selected at the time of the auto pre-set. Further, the receiver also saves time in the auto pre-set in selecting many channels because the time required for detecting the additional information at the auto pre-set is relatively short.

In accordance with still another aspect of the fifth and sixth invention, a broadcast signal receiver directs an external tuner to select channels in succession, and stores in the memory the selected channel as an additional information channel when the broadcast signal includes additional information. Therefore, the receiver can select the additional information channel from among the other channels in the same way the receiver does using the internal tuner.

In accordance with yet another aspect of the seventh and eighth invention, a broadcast signal receiver extracts station ID information from a broadcast signal for a selected channel, obtains a VCR Plus guide channel for the station identified by the station ID information, and stores a relationship between the guide channel and the reception channel, thus setting the relationship automatically. The receiver saves the user the trouble of a manual operation.

In accordance with a further aspect of the ninth invention, a tape recorder compares the required recording time for the program to be recorded with the remaining amount of tape on the cassette tape to be used for recording, and sets the appropriate recording mode based on the comparison. When the amount of recording tape is insufficient for the program continuation remaining time, the recorder starts in the standard mode, and automatically changes to the ⅓ speed mode as necessary to allow the recording of the whole program.

BRIEF DESCRIPTION OF THE DRAWINGS

FIG. 5 is a flow chart illustrating an example of the successive steps for setting an internal clock;

FIG. 8 is a diagram for explaining the setting of the relationship between the VCR Plus guide channel and the reception channel;

DESCRIPTION OF THE PREFERRED EMBODIMENT

The first embodiment, in which the present invention applies to a closed caption system, is described below with reference to the drawings.

Figure 1:
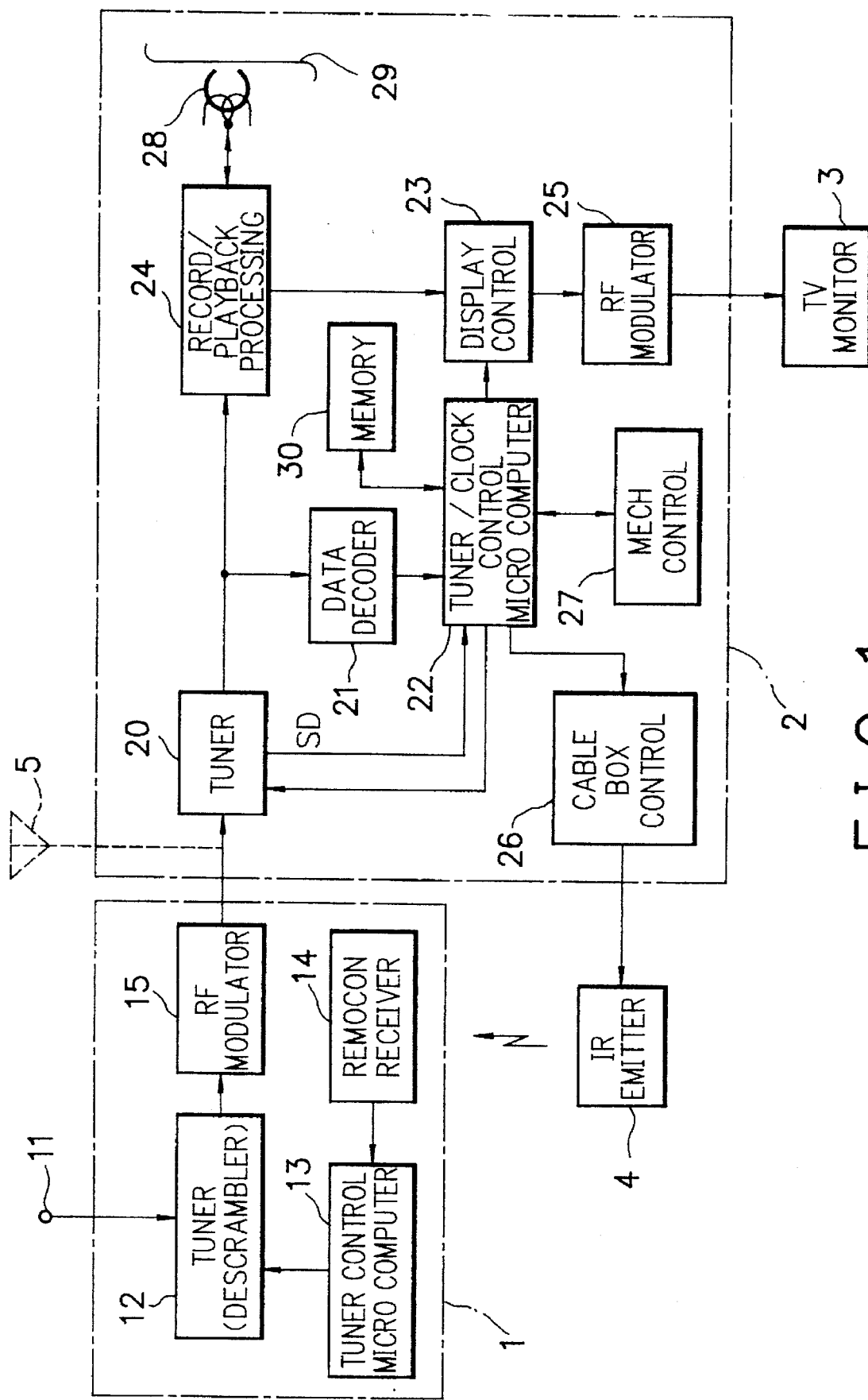
FIG. 1 is a block diagram illustrating the first embodiment according to the present invention.

In FIG. 1, a cable box functions to select and descramble CATV signals. The CATV signals, transmitted by cable (not shown), are supplied to the tuner 12 via the input terminal 11. The tuner 12 selects a channel from the CATV signals with a tuner control micro computer, and provides a video signal of the selected channel. The tuner 12 also has a descrambler which descrambles the scrambled video signal.

Reference numeral 14 denotes the remote control signal receiver which receives a remote control signal (an infrared ray, "IR", signal) from an IR emitter which is described below, and provides an information signal to the micro computer 13. The information signal contains information about the channel selection and on-off control.

The video signal from the tuner 12 is supplied to a RF modulator 15, which converts the video signal into a broadcast signal for the selected channel which is then supplied to a tuner 20 in the VCR (video cassette recorder) 2. The tuner 20 selects a channel through the tuner/clock micro computer 22.

Figure 2:
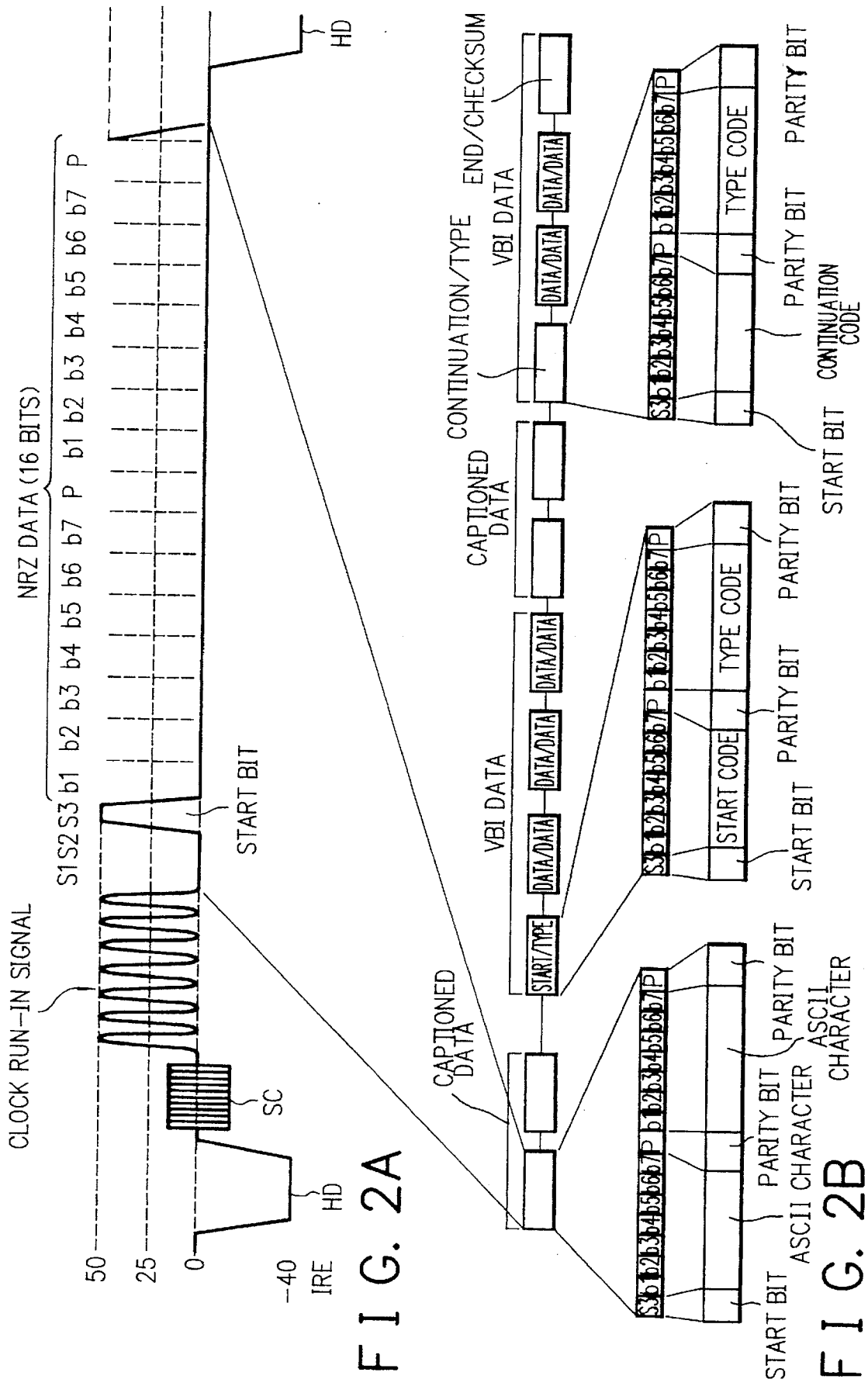
FIG. 2 is a diagram for explaining VBI data multiplexed with the broadcast signal.

A NTSC-type video signal from the tuner 20 is supplied to a data decoder 21. Captioned data (subtitle data) are inserted into a predetermined line of a vertical interval time code of the NTSC-type video signal. As shown in FIG. 2A, the captioned data consist of 7 cycles (503 KHz) of a clock run-in signal, two bits S1 and S2 at a low logic level ("0"), followed by a start bit S3 at a high logic level ("1"), and 16 bits of NRZ data (a data code). The clock run-in signal is a synchronizing signal with the data code in phase, and decodes the data code. The sixteen bits of the NRZ data are composed of a pair of groups which each consist of 7 bits b1 to b7 of an ASCII character and a bit of a parity code. In FIG. 2A, HD denotes a horizontal synchronizing signal, and SC denotes a color burst signal.

When captioned data are multiplexed with the predetermined line of the vertical interval time code of the video signal from the tuner 20, a data decoder 21 extracts the NRZ data, decodes its hexadecimal code into a BCD code, and supplies the decoded captioned data to the micro computer 22. In this case, the captioned data are stored in the RAM (random access memory), which is not shown, of the micro computer 22 on a predetermined frame basis, so that captions are displayed on the screen with pauses between sentences on a predetermined frame basis.

The captioned data, read out from the RAM of the micro computer 22, are supplied to the display control circuit 23, and are converted into character data (dot data). The control signal, which indicates a display position on the screen, is also supplied to the display control circuit 23. The display control circuit 23 generates a superimposed signal in accordance with the timing of the indicated display position and the character data, and the superimposed signal is overlapped onto the video signal supplied from the tuner 20 via a record/playback signal processing circuit 24.

The RF modulator 25 converts the video signal, provided from the display control circuit 23, into the broadcast signal for a selected channel, which is thereafter supplied to the TV monitor 3. Accordingly, captions can be superimposed on the screen of the TV monitor 3, when the captioned data is multiplexed with the video signal provided from the tuner 20.

Reference numeral 26 denotes a control driver for the cable box. Through the micro computer 22, the control driver 26 causes the IR emitter 4 to provide a remote control signal to the cable box 1. Accordingly, the VCR 2 can control the channel selection and the on-off control of the cable box 1.

Reference numeral 27 denotes a micro computer for controlling mechanisms such as a head drive, a reel drive, and a tape feeder.

Although not described, the tuner 20 detects the presence of the video signal through the inspection of the horizontal synchronizing signal. The output is supplied to the micro computer 22. Reference numeral 30 denotes the memory (RAM) used for storing a VBI channel as an additional information channel, which is described below.

When the captioned data is not multiplexed with the predetermined line of vertical interval time code in the video signal, special information (VBI data) can be transmitted through the line. For example, VBI data can include time information, such as the time of day and daylight saving time use ("DST use"), current and future program information such as start times, elapsed time, and contents, station information, and information about weather and disasters.

As shown in FIG. 2B, the VBI data are defined as being in the same format as the captioned data. Groups of the VBI data are transmitted on a plurality of lines. The VBI data in each of the lines is comprised of 16 bits of the NRZ data (a pair of groups which each are comprised of 7 bits b1 to b7 of a code and a bit of a parity code) beginning with the start bit.

In the first line on which groups of VBI data are transmitted, the first 7 bits carry a start code which indicates the class of VBI data, and the later 7 bits carry a code which indicates the type (sub-type) of the VBI data. Beginning with the second line, the first 7 bits and the later 7 bits carry the actual class or the type of data indicated in the first line.

As described above, the VBI data can be transmitted as long as time captioned data is not being transmitted. If the captioned data transmission starts before the completion of the VBI data transmission, the VBI data transmission is interrupted, and re-starts after the completion of the captioned data transmission (see FIG. 2B). Just after re-starting, the first 7 bits carry a continuation code in the first line, and the later 7 bits carry the code indicating the type of data.

In the last line of the VBI data transmission, the first 7 bits carry an end code, and the later 7 bits carry a check sum.

Examples of the classes and their types of data are described below.

The classes "Current Program Information" and "Future Program Information" each have types of data such as "Program Start Time", "Length/Time Elapsed", "Program Title", "Program Type", "Program Audience", and so on. The class "Channel Information" (special information about a selected channel other than the program being reviewed) has types of data such as "Name of Network" (a network name related to the selected local station), "Station ID", "Tape Delay" (tape delay hours and minutes for the network programs from the local station), and so on. The class "Miscellaneous Information" has types of data such as "Greenwich Time", "Local Time Zone and Daylight Saving Time Use", and so on. A class "Public Service/Weather Service/Message" has types, such as "Weather Service".

In this embodiment, the micro computer 22 in the VCR 2 extracts the local time data transmitted as VBI data as described above, and sets the internal clock automatically according to the local time data.

Figure 3:
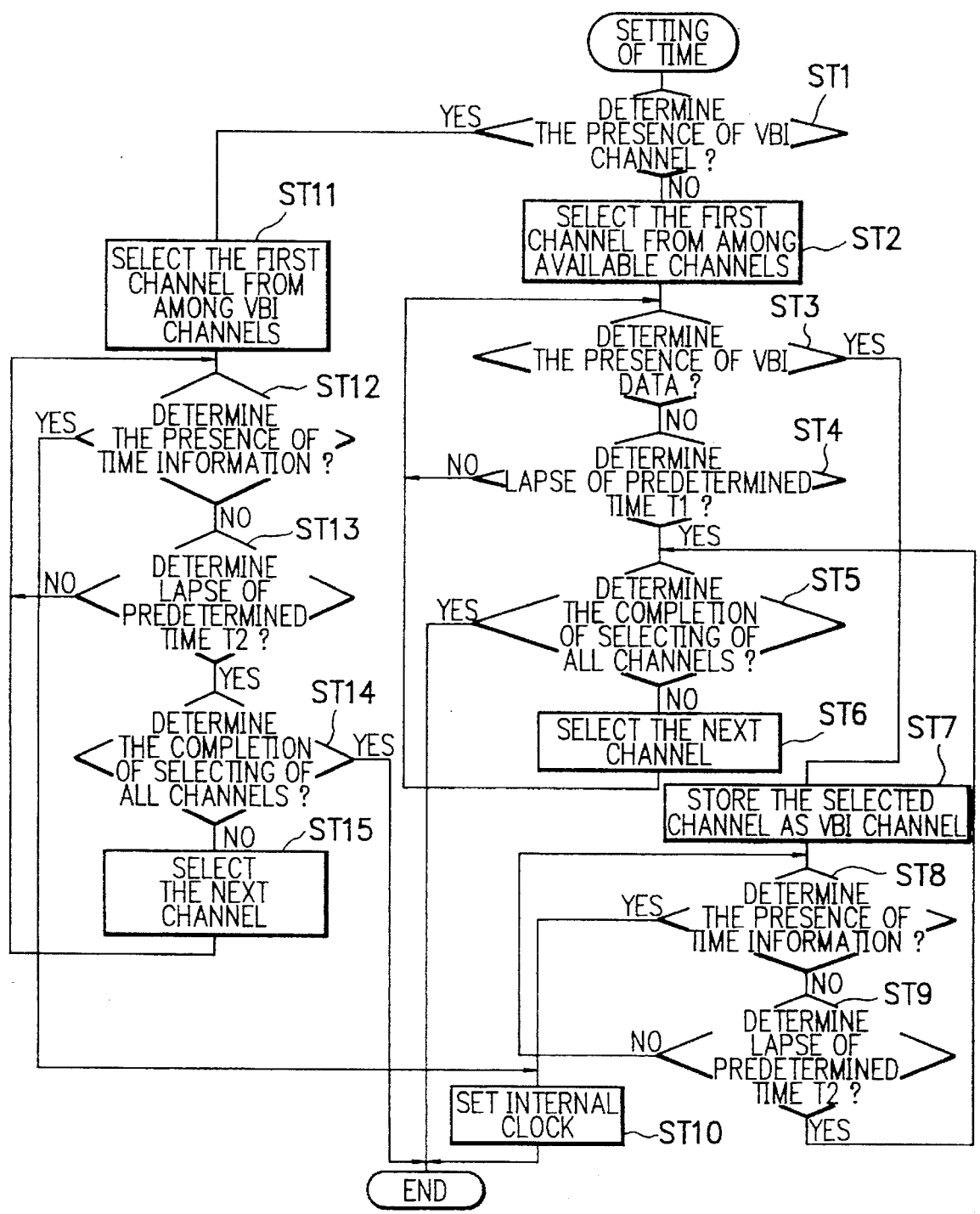
FIG. 3 is a flow chart illustrating an example of the successive steps for setting an internal clock.

FIG. 3 is a flow chart showing the successive steps for the micro computer 22 in setting the internal clock 22.

First, the micro computer 22 determines in step ST1 whether or not a VBI channel is stored in the memory 30. When a VBI channel is not stored, in step ST2, the micro computer 22 directs the IR emitter 4 to supply a remote control signal in order to begin the selection of the first channel from among available channels from the tuner 12.

In step ST3, the micro computer 22 determines whether or not VBI data is inserted in the predetermined lines of the vertical interval time code of the broadcast signal for the channel selected by the tuner 12 in the cable box 1. In other words, the VBI data is detected in a signal, when a certain code data, indicating a certain class or a type of data, is detected in the code data supplied from the data decoder 21 to the micro computer 22.

When it is determined in step ST3 that VBI data is not found in the signal, the determination is repeated for a predetermined time T1, for example, three minutes in step ST4. When the time T1 has elapsed and VBI data is still not found in the signal, the micro computer 22 determines in step ST5 whether or not the tuner 12 has selected all of the available channels. If all of the channels has been selected, the operation is completed. On the other hand, if the tuner 12 has not yet selected all of the available channels, the micro computer 22 directs the IR emitter 4 to supply the remote control signal in order to allow the tuner 22 to select the next channel in step ST6, and to determine the presence of the VBI data again, by continuing again to step ST3.

When it is determined in step ST3 that VBI data is found in the signal, the channel selected by the tuner 12 is stored as a VBI channel in the memory 30 in step ST7.

In step ST8, the micro computer determines whether or not the VBI data, including the time data, in other words, information about current time, is found in the video signal supplied from the tuner 20. As described above, this class indicates "Miscellaneous Information", and the types of data include "Greenwich Time" and "Local Time Zone and Daylight Saving Time Use". Local time data can be determined by measuring Greenwich Time and calculating the time difference from Greenwich Time.

Accordingly, the micro computer 22 determines that the time data is in the signal when the VBI data is of the type which provides "Local Time Zone and DST Use" or "Greenwich Time".

When it is determined in step ST8 that the time data is not found in the signal, the determination is repeated for a predetermined time T2, for example, 10 minutes. The determination time in step ST9 is set longer than that in step ST4 because such VBI data, including the time data, is less often transmitted than the other general VBI data.

When the time T2 has elapsed and the time data is still not found in the signal, the flow returns to step ST5. When it is determined in step ST9 that the time data is found in the signal, the current time is extracted from the time information (the VBI data including the current time) and the internal clock in the VCR 2 is set in step ST9, at which point the operation is completed.

If one or more VBI channels are stored in step ST1, in step ST11 the micro computer 22 directs the IR emitter 4 to supply the remote control signal in order to select the first VBI channel from among the available VBI channels from the tuner 12.

In step ST12, the micro computer 22 determines whether or not the VBI data, including the time data, in other words, the time information, is found in the video signal supplied from the tuner 20. The determination is the same as that in step ST8. In step ST12, when the time data is not found in the signal, the determination is repeated for a predetermined time T2, for example, 10 minutes in step ST13.

When the time T2 has elapsed and the VBI data is still not found in the signal, the micro computer 22 determines in step ST14 whether or not the tuner 12 has selected all of the available channels. If all of the channels have been selected, the operation is completed. On the other hand, if the tuner 12 has not yet selected all of the available channels, the micro computer 22 directs the IR emitter 4 to supply the remote control signal in order to allow the tuner 12 to select the next available channel as in step ST15, and determines the presence of the VBI data by returning to step ST12.

When it is determined in step ST9 that the time data is found in the signal, the current time is extracted from the time information (the VBI data including the time data) by which the internal clock in the VCR 2 is set in step ST12, at which point, the operation is completed.

Referring to FIG. 3, a VBI channel is stored at least once in the memory 30 at the time of the initial setting of the internal clock. The next time the internal clock is set, the search for a VBI channel is omitted and a VBI channel is selected from among the VBI channels stored in the memory 30, thereby saving time in the setting of the internal clock.

Although the VBI channels are automatically stored in the memory 30, the user may input a VBI channel into the memory 30 through a manual inputting means such as a keyboard (not shown). This may be convenient in the event the user knows the VBI channel. In this case, the internal clock in the VCR 2 is set by the time data extracted from the signal of such VBI channel, which is selected from among the VBI channels stored prior to the setting of the internal clock.

As described above, if a VBI channel is stored in the memory 30 through a manual inputting means after other VBI channels were stored automatically, such manually stored VBI channel stored manually will thereafter be selected on a priority basis.

A VBI channel may also be automatically stored in the memory 30, not at the initial setting of the internal clock, but at an auto pre-set when the VCR 2 searches for channels transmitting the necessary broadcast signal by searching channels one after another. In this way, the time required for searching for the VBI channel is shorter (for example, several frames) than time T1 required for the example in FIG. 3, thereby saving time in the auto pre-set in case many channels are selected.

The VBI channel stored in the memory 30 is not only used for the setting of the internal clock, but also used for other purposes, for example, for obtaining weather service data.

Figure 4:
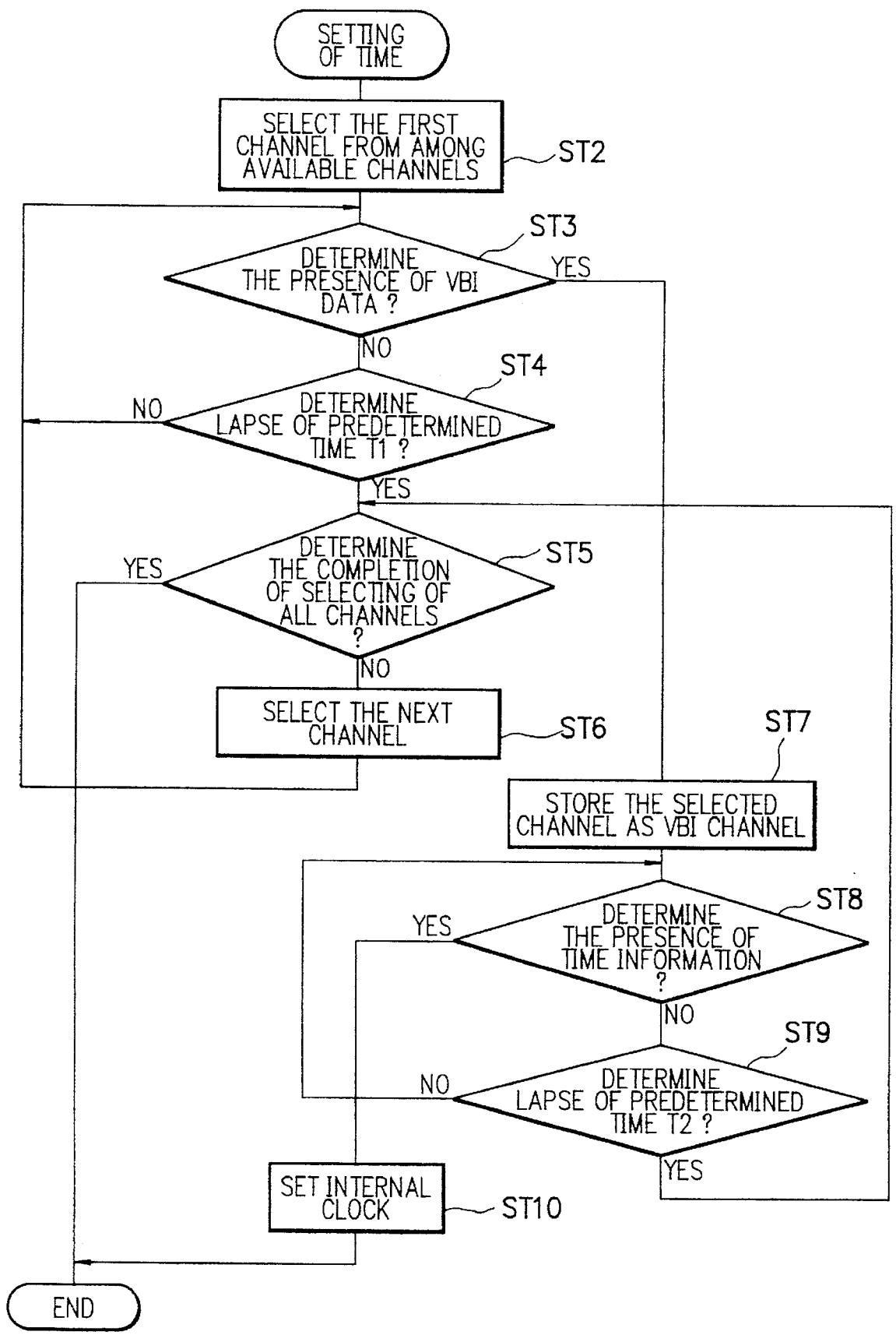
FIG. 4 is a flow chart illustrating an example of the successive steps for setting an internal clock.

FIG. 4 is a flow chart showing the successive steps for the micro computer 22 in setting the internal clock 22. Those steps corresponding to what was shown in FIG. 3 are given the same reference numeral.

In this case, step ST1 from FIG. 3 is eliminated. Here, a VBI channel is selected at the time for setting the internal clock regardless of whether or not the memory 30 has stored the VBI channel. Step ST7 may also be deleted because the VBI channel stored in the memory 30 is not used for setting the internal clock. However, the VBI channel can be used for purposes other than the internal clock setting, if step ST7 is not deleted and the VBI channel is stored in the memory 30.

FIG. 5 is a flow chart showing the successive steps for the micro computer 22 in setting the internal clock 22. Those steps corresponding to what was shown in FIG. 3 are given the same reference numeral.

Before moving to step ST3, the micro computer 22 determines in step ST16 whether or not the video signal is in the selected channel. The determination is carried out with the detection output SD supplied by the tuner 20 to the micro computer 22. When a video signal is found in the selected channel, the flow proceeds with step ST3. On the other hand, when the video signal is not found in the selected channel, the flow proceeds with step ST5.

It is obvious that VBI data is not to be found in the signal when there is no video signal in the selected channel. Skipping over step ST3 and ST4 saves time T1, thereby reducing the time required for the detection of the VBI channel.

Although in the above embodiment, the broadcast signal, from which a channel is selected by the tuner 12 in the cable box 1, is supplied to the tuner 20 in the VCR 2, this invention may be also applicable to a more simple arrangement with a VCR in which an antenna 5 (shown in FIG. 1 by the dotted line) or a cable (not shown) directly supplies the broadcast signal to the tuner 20. In this case, the micro computer 22 directs the tuner 20 to select the channels in succession, in order to search for a VBI channel.

Although, in the above embodiment, the local time data is extracted from the VBI data multiplexed with the vertical interval time code, portions, other than the vertical interval time code, may carry the local time data.

Further, in the above embodiment, the format of the VBI data is similar to the format of the captioned data. However, this invention may be used, even when the format of the VBI data is different from that of the captioned data.

Further, in the above embodiment, the present invention is applied to a closed-captioned system. This invention can be applied to a television receiver, a radio receiver, a satellite audio broadcast receiver, and so on, if the local time data is multiplexed with a video signal or an audio signal.

Figure 6:
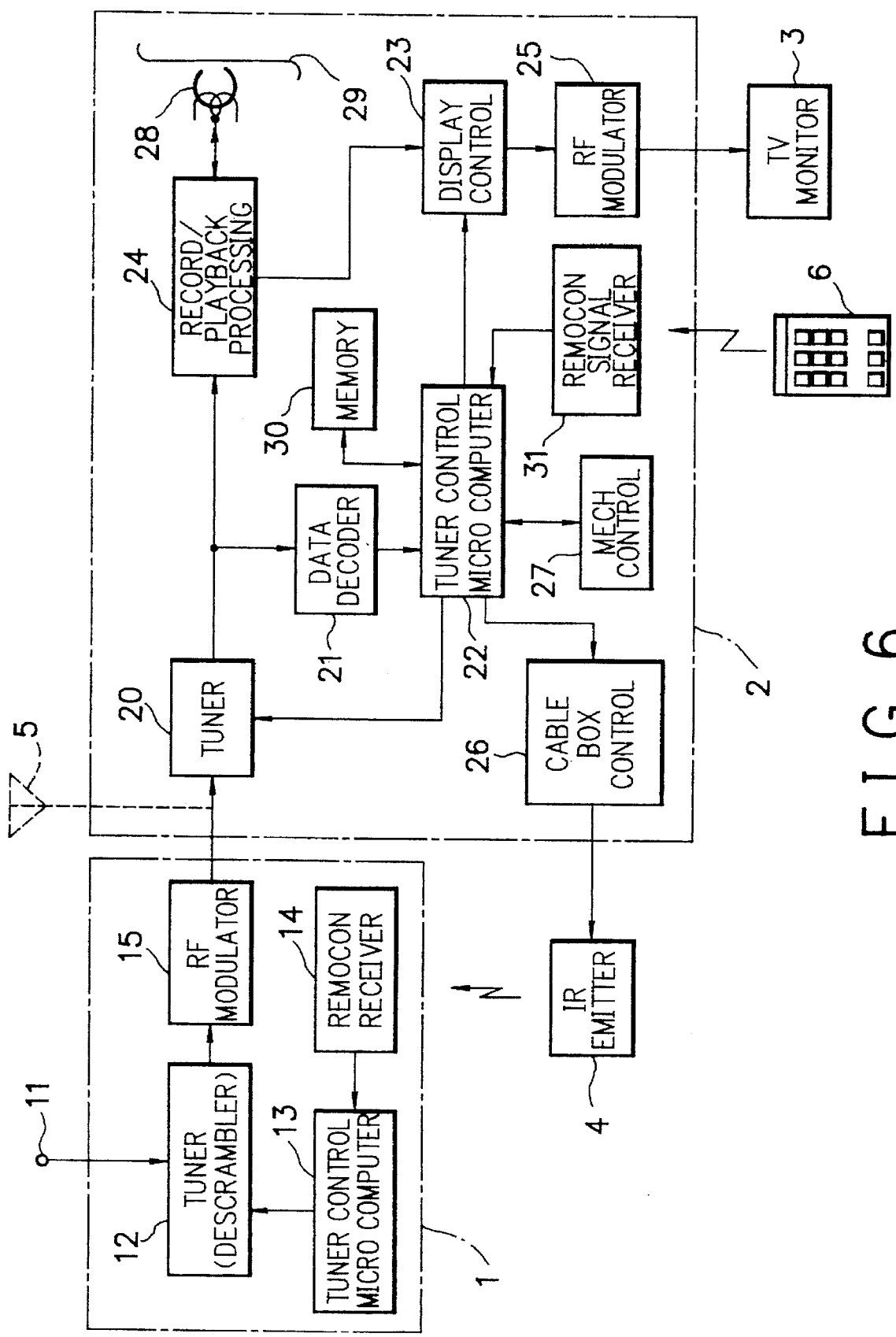
FIG. 6 is a block diagram illustrating the second embodiment according to the present invention.

The second embodiment, in which the present invention also applies to a closed caption system, is now described below with reference to FIG. 6. In FIG. 6, the micro computer 22 does not have a clock control function.

In the second embodiment, the micro computer 22 in the VCR 2 selects the channels in succession, extracts a station ID from the VBI data included in the broadcast signal for the selected channel in order to obtain the VCR Plus guide channel corresponding to the station ID, then stores the relationship between the guide channel and the reception channel in the memory 30, thus setting the relationship automatically.

Figure 7:
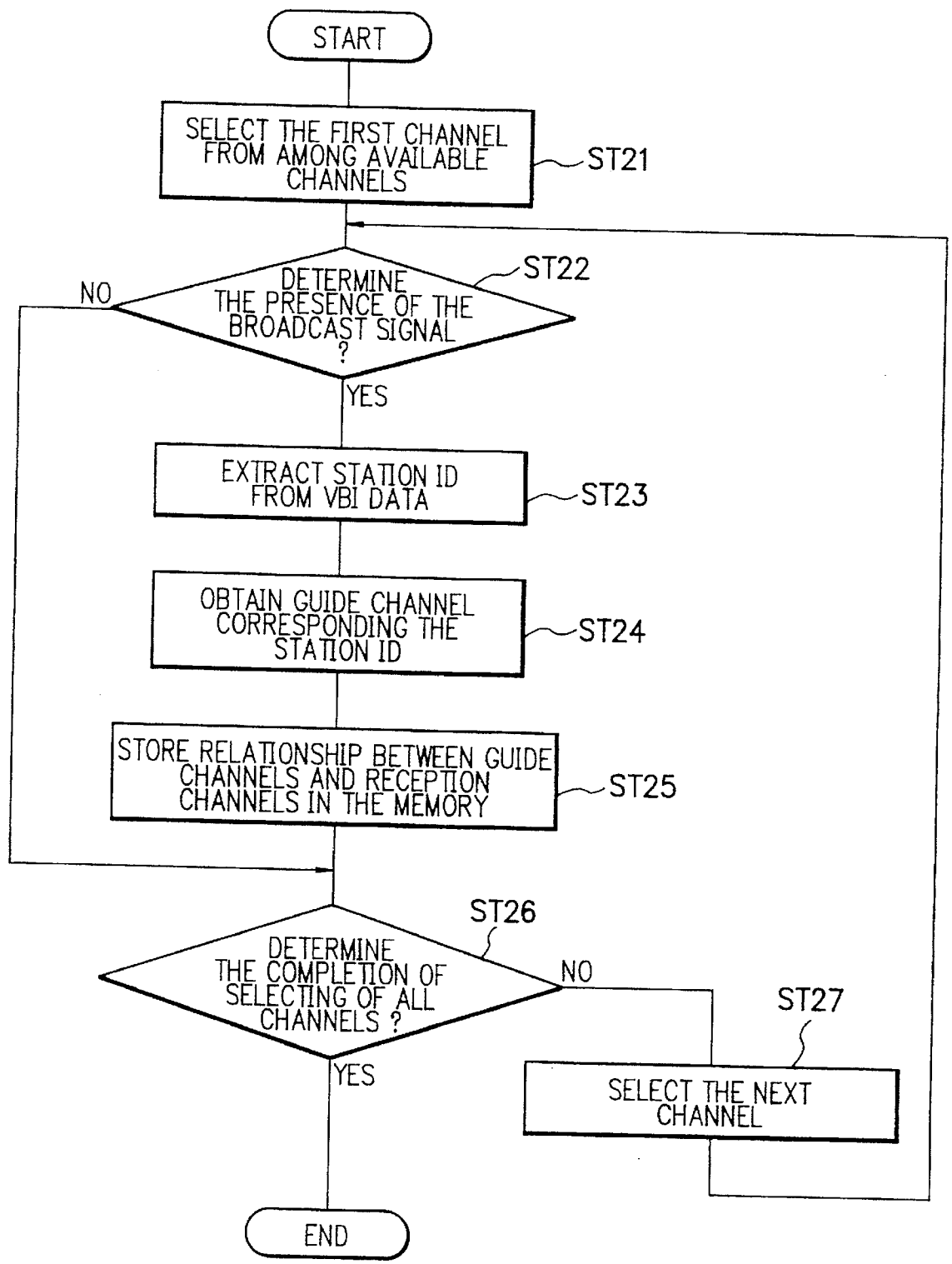
FIG. 7 is a flow chart illustrating an example of successive steps for setting the relationship between the VCR Plus guide channel and the reception channel.

FIG. 7 is a flow chart showing the successive steps for the micro computer 22 in setting the relationship for the VCR Plus guide channel and the reception channel.

First, in step ST21, the micro computer 22 directs the IR emitter 4 to supply the remote control signal in order to allow the selection of the first channel from among the available channels by the tuner 12.

In step ST22, the micro computer 22 determines whether or not the video signal is found in the selected channel. The determination is carried out with the detection output SD supplied from the tuner 20 to the micro computer 22. When the video signal is found in the selected channel, the flow continues with step ST23. On the other hand, when the video signal is not found in the selected channel, the flow continues with step ST26.

In step ST23, the station ID is extracted from the VBI data included in the predetermined lines of the vertical interval time code in the video signal supplied from the tuner 20. In step ST24, the VCR Plus guide channel corresponding to the extracted station ID is obtained from the relationship between the station ID and the guide channel previously stored in the memory 30. At the same time, the guide channel is stored in a predetermined area in the memory 30, associated with the channel selected by the tuner 12 at such time.

The micro computer 22 determines in step ST26 whether or not the tuner 12 has selected all of the available channels. When all of the channels have been selected, the operation is completed. On the other hand, if the tuner 12 has not yet selected all of the channels, the micro computer 22 directs the IR emitter 4 to supply the remote control signal in order to allow the tuner 12 to select the next available channel in step ST27, and the flow continues with step ST22.

In FIG. 6, reference numeral 6 denotes the remote control transmitter (commander) for the VCR 2. A remote control signal from the commander 6 is transmitted to the remote control receiver 31, and is provided to the micro computer 22. Thus, the VCR 2 is operated through the commander 6.

The timer recording using the VCR Plus code is described below. When receiving the VCR Plus code for a program, which the user intends to record using the timer, from the receiver 31 through the manual operation of the commander 6, the micro computer 22 decodes the VCR Plus code into the program start time and date, program end time, and the reception channel corresponding to the VCR Plus guide channel. Then, the micro computer 22 stores the decoded information in a predetermined area in the memory 30, referring to the relationship between the VCR Plus guide channel and the reception channel of the tuner 12 in order to convert the guide channel into the reception channel.

When the timer recording has been pre-set, the micro computer 22 directs the tuner 12 to select the designated reception channel and the recording of the video signal starts at the pre-set time. At the pre-set stop time, the micro computer 22 terminates the recording.

In the second embodiment, the VCR 2 can display the station ID, as well as the relationship between the VCR Plus guide channel and the reception channel for the tuner 12, on the TV monitor 3 through the manual operation of the commander 6. Further, when the VCR Plus code is supplied from the commander 6 to the micro computer 22 via the receiver 31, the VCR 2 can display the station ID as decoded data on the TV monitor 3, as well as other data such as the program start time and date, the program end time, the VCR Plus guide channel, and the reception channel for the tuner 12.

As described above, in the second embodiment, the relationship between the VCR Plus guide channel and the reception channel for the tuner 12 can be set automatically, thereby saving the user from problems.

Although in the second embodiment, the broadcast signal, from which the channel is selected by the tuner 12 in the cable box 1, is supplied to the tuner 20 in the VCR 2, this invention may be also applicable to a more simple arrangement with a VCR in which an antenna 5 (shown in FIG. 6 by the dotted line) or a cable (not shown) directly supplies the broadcast signal to the tuner 20.

Although, in the second embodiment, the relationship is extracted from the VBI data multiplexed with the vertical interval time code, portions, other than the vertical interval time code, may carry the data. Further, the format of the VBI data is similar to the format of the captioned data. However, this invention may be used even when the format of the VBI data is different from that of the captioned data.

Although, in the second embodiment, the present invention is applied to a closed captioned system, the present invention can be also applied to a television set.

Figure 9:
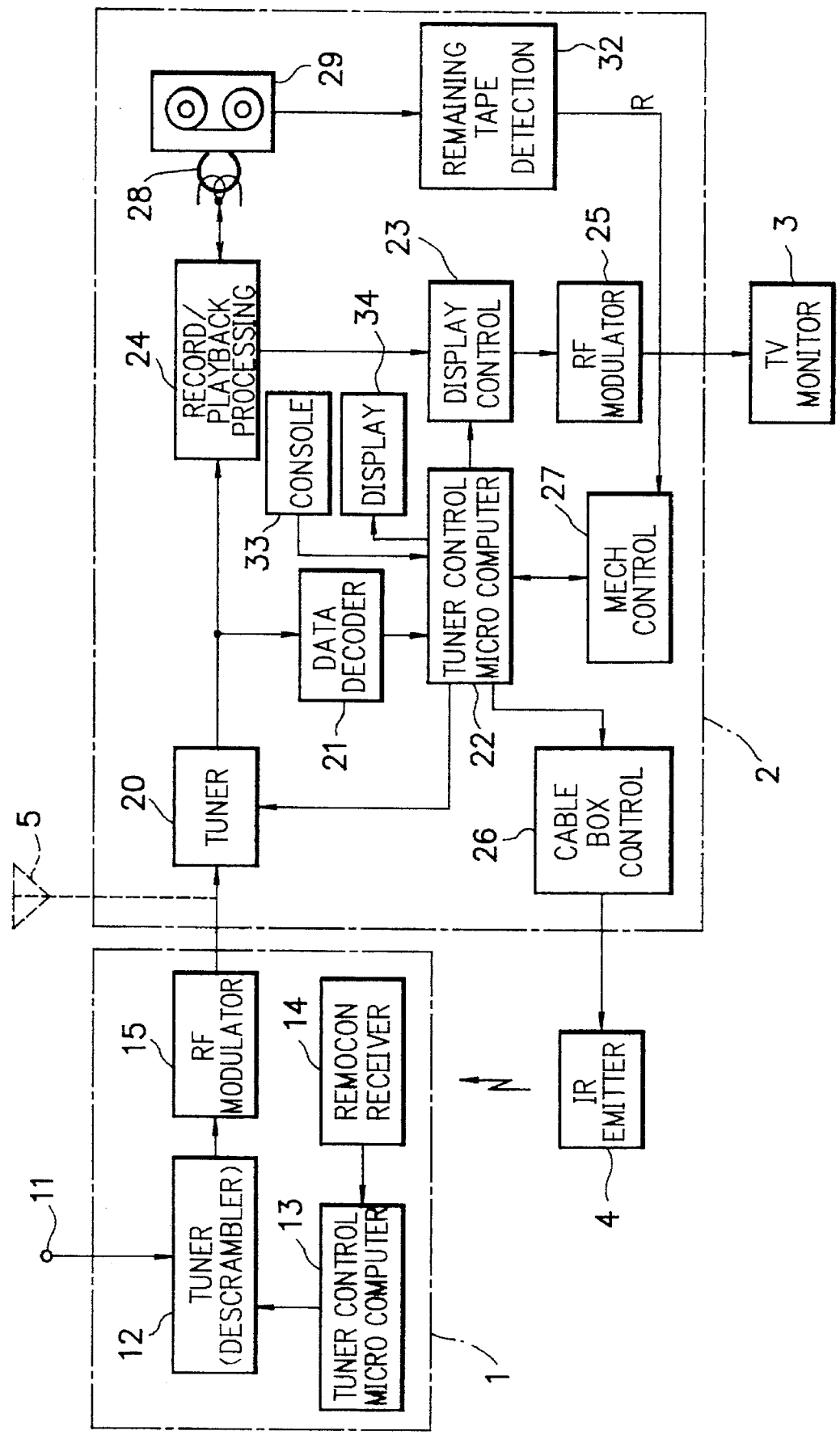
FIG. 9 is a block diagram illustrating the third embodiment according to the present invention.

The third embodiment, in which the present invention applies to a closed caption system, is now described below with reference to FIG. 9. The third embodiment is similar to that described in FIG. 1 above with the exception that the third embodiment provides a console 33, a display 34, and a tape detection circuit 32. In addition, the micro computer does not have a clock control function.

The micro computer 22 is connected to the console 33 with which the user operates the VCR 2. The VCR 2 also provides the display for displaying its operational status.

Two rotation pulses of a sending reel and a take-up reel are supplied to the tape detection circuit 32, which calculates the remaining recording time available for the cassette tape to be used for recording, based on the rotation time for the sending reel and the take-up reel and tape speed. The remaining recording time available calculated by the circuit 32 is supplied to the micro computer 22 via the micro computer 27. The method of calculating the remaining recording time available is disclosed in Provisional Publication No. 69193/92, and Publication No. 17992/82 in Japan.

When the VCR 2 starts the recording through the manual operation of the console 33, the micro computer 22 in the VCR 2 extracts the "Length/Time Elapsed" information concerning the program to be recorded from the VBI data. The micro computer 22 compares the program continuation time, based on the extracted information, with the remaining recording time available of the tape. The VCR 2 is then switched to the appropriate recording mode (the standard mode or the ⅓ speed mode) as a result of such comparison so as to allow the recording of the whole program on the magnetic tape 29.

Figure 10:
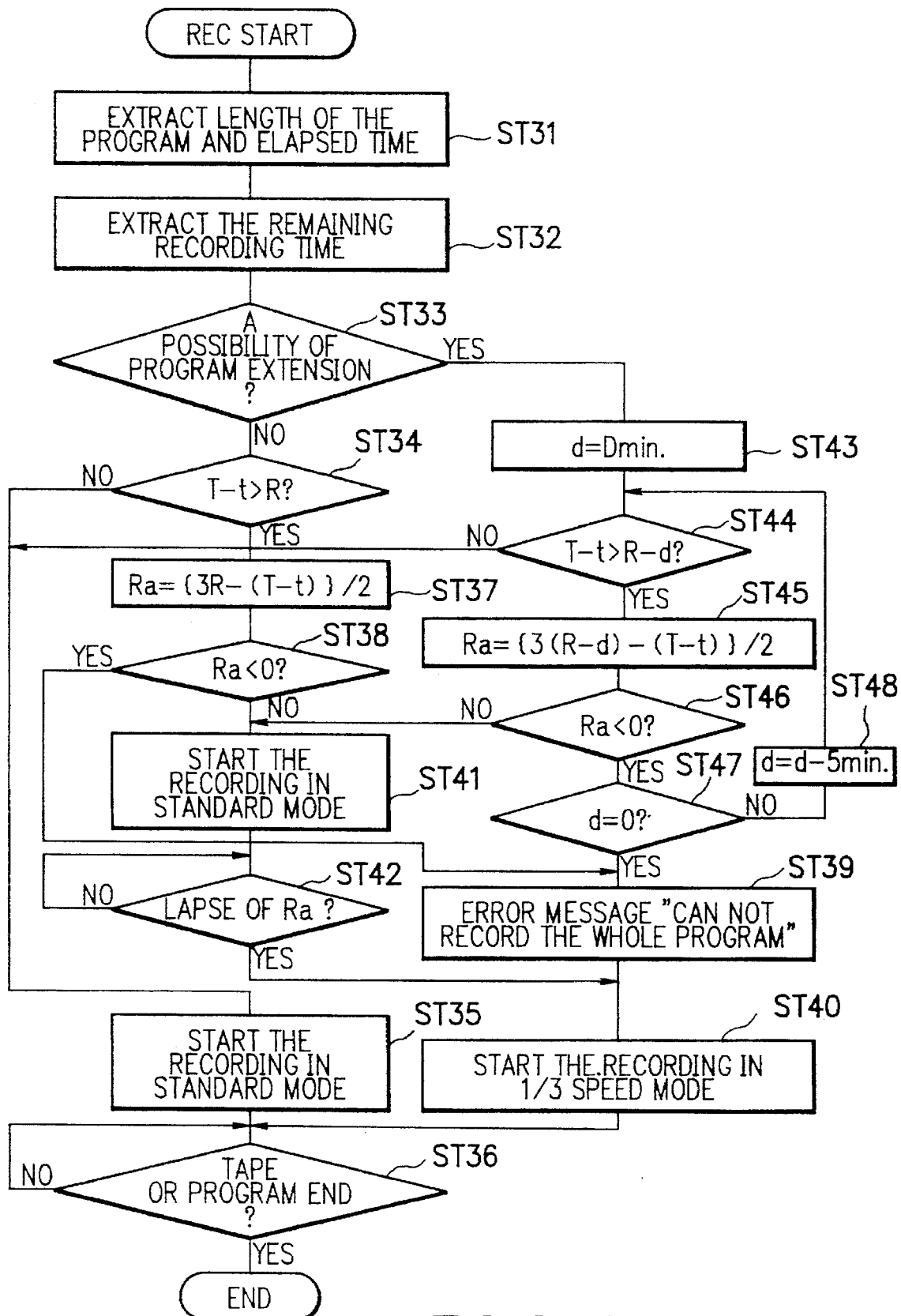
FIG. 10 is a flow chart illustrating an example of the successive steps for recording.

FIG. 10 is a flow chart showing the successive steps of the micro computer 22 in the fifth embodiment at the time of the recording through the manual operation of the console 33.

When the recording is started, the length of the program T and the elapsed time t are extracted from the VBI data in step ST31. Next in step ST32, the remaining recording time available R is calculated with the tape detection circuit 32.

Next in step ST33, the type of the program transmitted is determined from the VBI data and the micro computer 22 determines whether or not there is a possibility that the program may be extended in time based on that type. For example, there is a possibility that the time allotted for a program may be extended when the type data indicates the program is a sporting event.

When there is no possibility of program extension, the micro computer 22 determines in step ST34 whether or not the condition meets the equation T−t>R. T−t represents the program continuation time in which the program continues from a given point in time to the end of the program. If the condition does not meet T−t>R, in other words, the remaining recording time available R is greater than the program continuation time T−t, the whole program can be recorded on the magnetic tape 29 in the standard speed mode. Accordingly, the recording starts in the standard speed mode in step ST35, and is terminated in step ST36 when the tape or the program ends.

When the condition meets T−t>R in step ST34, in other words, the remaining recording time available R is less than the program continuation time T−t, it is impossible to record the whole program on the magnetic tape 29 in the standard speed mode. In step ST37, the available time Ra for recording in the standard speed mode can be obtained from the equation:

$$Ra=\{3R-(T-t)\}/2$$

In step ST38, the micro computer 22 determines whether or not the condition meets Ra<0. When the condition meets Ra<0, the program continuation time T−t is greater than three times of the remaining recording time available R. In other words, it is impossible to record the whole program even in the ⅓ speed mode. When the condition meets Ra<0, the display 34 displays an error message "Cannot record the whole program" in step ST39. Thereafter, the recording starts in the ⅓ speed mode in step 40, and is terminated in step ST36 when there is no more tape or the program ends.

If the condition does not meet Ra<0 in step ST38, the whole program can be recorded in the standard speed mode during the time Ra and thereafter in the ⅓ speed mode. Therefore, if the condition does not meet Ra<0, the recording starts in the standard speed mode in step ST41, and the elapsed time is detected in step ST42. When the elapsed time becomes equal to the time Ra, the recording mode is converted into the ⅓ speed mode in step ST40. The recording is terminated in step ST36 when there is no more tape or the program ends.

When the possibility that the program may be extended is detected in step ST33, a forecasted program extension time d is set to be, for example, 30 minutes. In step ST44, the micro computer 22 determines in step ST44 whether or not the condition meets T−t>R−d. The recorder can record efficiently when the program may be extend by comparing the remaining recording time available R minus the forecasted program extension time d with the program continuation time T−t.

When it is determined in step ST44 that the condition does not meet T−t>R−d, in other words, the remaining recording time available R−d is less than the program continuation time T−t, the whole program can be recorded on the magnetic tape 29 in the standard speed mode. Accordingly, the recording starts in the standard speed mode in step ST35, and is terminated in step ST36 when the program ends.

If the condition meets T−t>R−d in step ST44, in other words, the remaining recording time available R−d is greater than the program continuation time T−t, it is impossible to record the whole program on the magnetic tape 29 in the standard speed mode. In step ST45, the available time Ra for recording in the standard speed mode can be obtained from the equation:

$$Ra=\{3(R-d)-(T-t)\}/2$$

Step ST46 determines whether or not the condition meets Ra<0. If the condition meets Ra<0, the program continuation time T−t is greater than three times the remaining recording time available R−d. In other words, it is impossible to record the whole program even in the ⅓ speed mode. When the condition meets Ra<0, step ST47 determines whether or not the condition meets d=0. When d does not equal to 0, five minutes are subtracted from the forecasted program extension time d and the flow continues with step ST44.

When the condition meets d=0, it is impossible to record the whole program even in the ⅓ speed mode. When the condition meets d=0, the display 34 displays an error message "Cannot record the whole program" in step ST39. Thereafter, the recording starts in the ⅓ speed mode in step 40, and is terminated in step ST36 when there is no more tape or the program ends.

When the condition meets Ra<0 in step ST46, the whole program can be recorded in the standard speed mode during the time Ra and thereafter in the ⅓ speed mode. Therefore, if the condition does not meet Ra<0, the recording starts in the standard speed mode in step ST41, and the elapsed time is detected in step ST42. When the elapsed time becomes equal to the time Ra the recording mode is converted into the ⅓ speed mode in step ST40. The recording is terminated in step ST36 when there is no more tape or the program ends.

As described above, the tape recorder can control the speed mode of the recording based on the result of the comparison of the remaining recording time available R (or R−d) with the program continuation time T−t. Even when the remaining recording time available R (or R−d) is less than the program continuation time T−t, the whole program can be recorded in the standard speed mode during the time Ra and thereafter in the ⅓ speed mode.

In such a situation, the whole program can be also recorded from the beginning to the end in the ⅓ speed mode instead of the standard speed mode during the time Ra. However, the time Ra for recording in the standard speed mode provides an enhanced quality of recorded video image.

Further, the fifth embodiment subtracts the forecasted program extension time d from the remaining recording time available R when there is a possibility that the program may be extended in time. Thus, the recorder works effectively in this case as well.

Although in the third embodiment, the broadcast signal, from which the channel is selected by the tuner 12 in the cable box 1, is supplied to the tuner 20 in the VCR 2, this invention may be also applicable to a more simple arrangement with a VCR in which an antenna 5 (shown in FIG. 9 by the dotted line) or a cable (not shown) directly supplies the broadcast signal to the tuner 20.

Although, in the third embodiment, the local time data is extracted from the VBI data multiplexed with the vertical interval time code, portions, other than the vertical interval time code, may also carry the program length T and the elapsed time t. Further, in the above embodiment, the format of the VBI data is similar to the format of the captioned data. However, even when the format of the VBI data is different from that of the captioned data, this invention may be used.

Further, in the third embodiment, the present invention is applied to a closed captioned system. This invention can also be applied to an audio signal recorder for recording the broadcast signal.

According to the invention, the broadcast signal receiver selects channels in succession, and stores in its memory a selected channel as an additional information channel when it receives a broadcast signal which includes necessary additional information. Thus, the receiver can detect the additional information channel from among the other available channels.

When an external tuner is used, the broadcast signal receiver directs the external tuner to select channels in succession, and store in the memory a selected channel as an additional information channel in the memory. Therefore, the receiver can select an additional information channel from among the other channels in the same way the receiver does using the internal tuner.

When the memory in the receiver stores additional information channels, the receiver can search the additional information channels efficiently by selecting these channels in order.

When a VBI channel is stored in the memory 30 through a manual inputting means after other VBI channels are stored automatically, the receiver can also search the additional information channels efficiently by giving priority to the channel stored manually.

The receiver can also search the additional information channels efficiently by skipping over the selected channel when the selected channel does not have the broadcast signal, and searching for the next channel.

The broadcast signal receiver selects channels in succession at the time of an auto pre-set, and stores the channel received as an additional information channel in the memory when receiving a broadcast signal which includes the additional information. Thus, the receiver can detect the additional information channel among the channels at the time of the auto pre-set.

Further, the receiver also saves time in the auto pre-set in selecting many channels because the time required for searching the additional information during the auto pre-set is relatively shorter.

According to the invention, the broadcast signal receiver extracts station ID information from the broadcast signal for the selected channel, obtains the VCR Plus guide channel for the station identified by the station ID information, and stores the relationship between the guide channel and the reception channel, thus setting the relationship automatically. The receiver saves the user the trouble of a manual operation.

According to the invention, the tape recorder compares the possible recording time corresponding to the amount of tape remaining with a program continuation time, and sets the recording mode based on the comparison. Even when the remaining recording time available is less than the program continuation time, the recorder starts the recording in a ⅓ speed mode after being set in a standard mode, thereby recording the whole program. Further, the recorder subtracts the forecasted program extension time from the remaining recording time available R when there is a possibility that the program may be extended in time. Accordingly, the recorder works effectively in this case as well.

What is claimed is:

1. A broadcast signal receiver having an internal clock, said receiver comprising:
channel selection means for selecting channels in succession;
information detection means for determining the presence or absence of additional information included in a broadcast signal for channels selected;
memory for storing a selected channel regarded as a reception channel for said additional information when said information detecting means determines the presence of said additional information in said broadcast signal for said selected channel; and
means for receiving said additional information and, without a user initiating a request to set said internal clock, for automatically setting said internal clock in accordance with said additional information.

2. The broadcast signal receiver in accordance with claim 1 wherein said channel selection means selects channels in succession from among reception channels previously stored in said memory after said memory has stored reception channels containing said additional information.

3. The broadcast signal receiver in accordance with claim 1 wherein said memory has channel inputting means for inputting a reception channel containing said additional information and the channel selection means selects, on a priority basis, the reception channel inputted by said channel inputting means over the reception channel in which the presence of said additional information was determined by said information detection means.

4. The broadcast signal receiver, in accordance with claim 1 further comprising signal detection means for determining the presence or absence of said broadcast signal in said selected channel, wherein said information detection means is prevented from searching for the presence of said additional information and said channel selection means is directed to select the next channel immediately when said signal detection means does not detect any said broadcast signal in the selected channel.

5. The broadcast signal receiver of claim 1, further including an external tuner and video processor, wherein said channel selection means, said information detection means and said memory are provided in said video processor.

6. The broadcast signal receiver in accordance with claim 5 wherein said channel selection means selects channels in succession from among reception channels previously stored in said memory after said memory has stored reception channels containing said additional information.

7. The broadcast signal receiver in accordance with claim 5 wherein said memory has channel inputting means for inputting said reception channels containing said additional information and the channel selection means selects, on a priority basis, the reception channel inputted by said channel inputting means over the reception channel in which the presence of said additional information is detected by said information detection means.

8. The broadcast signal receiver in accordance with claim 5, wherein said video processor further comprises signal detection means for determining the presence or absence of said broadcast signal in said selected channel, said information detection means being prevented from detecting the presence of said additional information in said broadcast signal and said channel selection means is directed to select the next channel immediately when said signal detection means does not detect any said broadcast signal in the selected channel.

9. A method of detecting a reception channel containing additional information through a broadcast signal receiver having an internal clock, said method comprising the steps of:

selecting channels in succession;

determining the presence or absence of additional information included in a broadcast signal for the selected channel;

storing in a memory said selected channel regarded as a reception channel containing said additional information upon detecting said additional information in said broadcast signal for said selected channel; and automatically setting said internal clock in accordance with said additional information without a user initiating a request to set said internal clock.

10. The method of claim 9 whereby said broadcast signal receiver has an external tuner and a video processor, and said video processor directs said external tuner to select channels in succession;

said video processor determines the presence or absence of additional information included in said broadcast signal for the selected channel; and said selected channel regarded as a reception channel containing said additional information is stored in the memory of said video processor.

11. A broadcast signal receiver, comprising:

first channel selection means for selecting channels in succession at the time of auto pre-set;

first information detection means for determining, in the first period of time, the presence or absence of additional information included in said broadcast signal for the channel selected by said first channel selection means;

second channel selection means for selecting channels in succession independently of said first channel selection means;

second information detection means for determining, during the second period of time which is longer than said first period of time, the presence or absence of additional information included in said broadcast signal selected by said second channel selection means;

memory for storing the selected channel regarded as a reception channel for said additional information when said first or second information detecting means detects the presence of said additional information in said broadcast signal for the selected channel; and means for receiving said additional information and, without a user initiating a request to set said internal clock, for automatically setting an internal clock in accordance with said additional information.

12. The broadcast signal receiver in accordance with claim 11, further comprising:

signal detection means for determining the presence or absence of said broadcast signal in the channel selected by said first or second channel selection means; and said first or second information detection means, prevented from searching for the presence of said additional information in said broadcast signal and said first or second channel selection means directed to select the next channel immediately when said signal detection means does not detect any said broadcast signal in the selected channel.

13. A method of detecting a reception channel containing additional information through a broadcast signal receiver, comprising the steps of:

selecting channels in succession at the time of auto pre-set;

determining, in the first period of time, the presence or absence of additional information which is included in said broadcast signal for the first channel selected in the time of said auto pre-set;

storing in a memory said first selected channel regarded as a reception channel for said additional information when detecting, in said first period of time, the presence of said additional information in said broadcast signal for said first selected channel;

selecting channels in succession independently of said auto pre-set;

determining, in a second period of time which is longer than said first period of time, the presence or absence of additional information included in said broadcast signal for the second channel selected independently of said auto pre-set;

storing in a memory said second selected channel regarded as a reception channel for said additional information when detecting, in said second period of time, the presence of said additional information in said broadcast signal for said second selected channel; and automatically setting an internal clock in accordance with said additional information without a user initiating a request to set said internal clock.

14. A broadcast signal receiving apparatus comprising:

an internal clock;

means for receiving broadcast signals representing a plurality of channels of information signals in which at least one of said channels may include time information;

means receiving a channel of information signals for determining whether the received channel includes said time information and, if said received channel is determined not to include said time information, for selecting another channel in succession and determining whether the selected other channel includes said time information; and means for obtaining said time information from the channel determined to contain said time information and for automatically setting said internal clock in accordance with the obtained time information without a user initiating a request to set said internal clock.

15. A broadcast signal receiver, comprising:

channel selection means for selecting channels in succession;

information detection means for determining the presence or absence of additional information included in a broadcast signal for channels selected;

memory for storing a selected channel regarded as a reception channel for said additional information when said information detecting means determines the presence of said additional information in said broadcast signal for said selected channel; and means for automatically storing a relationship between a VCR Plus guide channel and the selected channel without a user initiating a request to store said relationship, said automatically storing means including information extracting means for extracting station identification information included in said broadcast signal for the selected channel, guide channel providing means for providing the VCR Plus guide channel corresponding to a station identified by said station identification information, and a further memory for storing the relationship between said selected channel and said VCR Plus guide channel.

16. The broadcast signal receiver in accordance with claim 15, further comprising:

decoder means for decoding said VCR Plus code into said VCR Plus Guide channel;

channel converting means for converting said VCR Plus guide channel into the reception channel, referring to said relationship between said selected channel and said VCR Plus guide channel; and said channel selection means is operative to select said reception channel converted by said channel converting means.

17. A broadcast signal receiver, comprising:

an external tuner;

a video processor having channel selection means operative for directing said external tuner to select channels in succession and means for automatically storing a relationship between a VCR Plus guide channel and the selected channel without a user initiating a request to store said relationship, said automatically storing means including information extracting means for extracting station identification information included in a broadcast signal for the selected channel, guide channel providing means for providing the VCR Plus guide channel corresponding to a station identified by said station identification information, and a memory for storing the relationship between said selected channel and said guide channel;

information detection means for determining the presence or absence of additional information included in the broadcast signal for channels selected; and memory for storing a selected channel regarded as a reception channel for said additional information when said information detecting means determines the presence of said additional information in said broadcast signal for said selected channel.

18. The broadcast signal receiver in accordance with claim 17, wherein said video processor further comprising:

decoder means for decoding said VCR Plus code into said VCR Plus guide channel;

channel converting means for converting said VCR Plus guide channel into the reception channel, referring to said relationship between said selected channel and said VCR Plus guide channel; and said channel selection means for selecting said reception channel converted by said channel converting means.

19. A broadcast signal receiver, comprising:

channel selection means for selecting channels in succession;

information detection means for determining the presence or absence of additional information included in a broadcast signal for channels selected, said broadcast signals representing a number of programs classified in respective types;

memory for storing a selected channel regarded as a reception channel for said additional information when said information detecting means determines the presence of said additional information in said broadcast signal for said selected channel; and a tape recorder including time measuring means for measuring, at the time of starting recording, remaining recording time available corresponding to an amount of remaining tape of a cassette, which is to be used for recording; program time extracting means for extracting a program continuation time for a desired program from said broadcast signal; time comparing means for comparing said remaining recording time available with said program continuation time; means for determining whether a possibility exists that said desired program may be extended in time due to the respective type of said desired program; and mode control means for controlling a recording speed mode according to the comparison of said time comparing means and the results of the determination as to whether said desired program may be extended.

20. The tape recorder in accordance with claim 19, wherein said mode control means directs the recording in a standard speed mode when said remaining recording time available is greater than said program continuation time, and in a ⅓ speed mode when said remaining recording time available is less than said program continuation time.

21. The tape recorder in accordance with claim 20, wherein said time comparing means subtracts a program extension time from said remaining recording time available before comparing.

22. A broadcast signal receiving apparatus comprising:

means for receiving broadcast signals representing a plurality of programs and including additional information, in which said programs are classified in respective types;

means for recording a desired program onto a recording medium at one of a plurality of recording speeds; and means for determining whether a possibility exists that said desired program may be extended in time due to the respective type of said desired program and for automatically determining the recording speed in accordance with the results of such determination and said additional information.

23. A broadcast signal receiving apparatus according to claim 22, wherein said additional information includes information representative of the length of said desired program and the time which may have elapsed from the start of said desired program.

24. A broadcast signal receiving apparatus according to claim 23, wherein said determining means includes means for determining a program remaining time indicative of the time remaining for said desired program from the length and elapsed time information, means for determining a recording time of said recording medium which is currently available when recording at a first recording speed, and means for comparing the program remaining time and the currently available recording time so as to obtain a comparison result and for selecting one of said first recording speed and a second recording speed which is slower than said first recording speed based on said comparison result.

25. A broadcast signal receiving apparatus according to claim 24, wherein the selecting means selects said first recording speed when said comparison result indicates that said currently available recording time is at least equal to said program remaining time.

26. A broadcast signal receiving apparatus according to claim 25, wherein the selecting means selects one of (i) said second recording speed and (ii) said first recording speed for a portion of the recording of said desired program and said second recording speed for the remainder of the recording of said desired program, when said comparison result indicates that said currently available recording time is less than said program remaining time.

27. A broadcast signal receiving apparatus according to claim 26, wherein said means for determining whether a possibility exists and for automatically determining the recording speed determines whether said program remaining time of said desired program may be extended due to the respective type of said desired program and compensates one of said program remaining time and said currently available recording time accordingly.

* * * * *